United States Patent [19]  
Abe

[11] 4,073,958  
[45] Feb. 14, 1978

[54] RICE FLAVORED SNACK FOOD

[76] Inventor: Shunji Abe, 1-banchi Oaza Tsuchikawa, Ojiya, Niigata, Japan

[21] Appl. No.: 681,203

[22] Filed: Apr. 28, 1976

[51] Int. Cl.² ............................................. A21D 10/00
[52] U.S. Cl. ..................................... 426/559; 426/808
[58] Field of Search ................. 426/549, 559, 807, 808

[56] References Cited

U.S. PATENT DOCUMENTS

| 3,027,258 | 3/1962 | Markakis et al. | 426/808 X |
|---|---|---|---|
| 3,600,193 | 8/1971 | Glabe et al. | 426/808 X |
| 3,682,652 | 8/1972 | Corbin et al. | 426/808 X |
| 3,925,567 | 12/1975 | Abe | 426/559 |

*Primary Examiner*—Joseph M. Golian  
*Attorney, Agent, or Firm*—Finnegan, Henderson, Farabow & Garrett

[57] ABSTRACT

A novel snack food product can be obtained by preparing a corn dough cake by kneading finely divided corn materials with water, if desired with the addition of rice bran materials derived from Japanese rice wine production and/or defatted soybeans, followed by shaping, drying, baking and seasoning.

19 Claims, No Drawings

RICE FLAVORED SNACK FOOD

This invention relates to a novel snack food having rice crackers flavor achieved by incorporating rice bran materials and/or defatted soybeans into finely divided corn materials and the process therefor. More particularly, the invention relates to a novel snack food essentially consisting of corn materials that are inexpensive and provide a controlled superior swelling quality and the process therefor.

As is well known, rice crackers have unique flavour due to the contents of amino acids based on lysine hydrochloride, arginine hydrochloride, alanine, etc., and insufficient content of the above amino acids causes deterioration of the product flavour.

Accordingly, in prior art, the starch materials other than rice materials can be used for the production of rice crackers only with the addition of amino acid preparations. Many additives for this purpose are available commercially. However, it is known that the conventional amino acid preparations are only effective for up to 40% content of such substitution materials as corn materials, and thus, substantial replacement by other substitution materials than rice can not be expected by means of such conventional amino acid additives.

Accordingly, the main object of the present invention is to provide a novel process for producing a rice-flavoured product from the starch substitution materials other than rice and to provide a novel snack food obtained therefrom.

Recently, the inventor of the present invention has found that a novel product can be obtained by preparing a corn dough cake by kneading finely divided corn materials with steam, followed by shaping, drying, baking and seasoning, without any addition of rice materials. However, the products obtained have some unpleasant and strange smells that must be overcome for successful marketing.

The inventor has also found that rice bran materials derived from the Japanese rice wine production can be used to impart rice flavour to the corn dough cake quite conveniently and satisfactorily. The products obtained by mixing it with such corn materials as finely divided waxy corn (corn grits) or waxy starch have proved to have satisfactory rice flavour and desirable soft texture.

The rice bran materials obtained from Japanese rice wine production is generally contain a larger amount of proteins, fats, vitamins, etc. than that of the polished grain rices and generally are white to red colored depending on the degrees of refined rice wines.

In the course of Japanese rice wine production, surface portions of rice grains should be removed by polishing, the amount depending on the desired level of rice wine refining. The amount to be polished usually reaches up to approximately 60% of original weight of the rice grains. This amount is much more than that of grained rice polishing used in conventional rice industries.

Thus, the rice bran materials obtained from Japanese rice wine production are usually white colored and have slightly more odor due to the higher content of crude protein, crude fat, ash, etc. than those of inner portions of polished rice grains. Because of their unpleasant smells and their swell-disturbing characteristics, they could not be used in the conventional rice cracker industries in the prior art and sold as industrial waste very cheaply.

In the following tables, compositions of corn grits and waxy corn starch, and white rice bran materials and polished rice grains are shown for comparison.

Table 1.

| | Material | Deodorized grits | Grits | Waxy corn starch |
|---|---|---|---|---|
| Composition, Property | | | | |
| | Water % | 9.3 | 12.4 | 13.5 |
| Amylography | Gelatinizing ° C temperature | 61.0 | 65.5 | 67.0 |
| | Max. viscosity Bu | 460 | 180 | 900 |
| | Min. viscosity Bu | 73 | 180 | 250 |
| | Final viscosity Bu | 200 | 290 | 500 |
| | pH | 3.90 | 5.03 | 4.5 |
| Color | Blue filter 85.0 | 83.2 | 76.5 | 90 |
| | Green filter 85.5 | 90.5 | 86.0 | — |
| | Ash % | 0.25 | 0.36 | 0.04 |
| | Crude protein % | 9.0 | 9.0 | 0.35 |
| | Reducing sugar % | 2.51 | 2.26 | 0 |

Note: Sampled grits are subjected to soak in water at 60° C for 3 hours, ground by an atomizer (made by Fuji Electric Co.), and then dried at 50° C for 24 hours.

Table 2.

| Composition | Water (%) | Fat (mg/100g) | Nitrogen (mg/g) | Crude protein (%) |
|---|---|---|---|---|
| Material | | | | |
| White rice bran | 12 | 1.0–3.1 | 22 | 13.2 |
| Polished rice grains | 14 | 0.77 | 13 | 7.7 |

As can be clearly understood from the tables, polished rice grains may be substituted by white rice bran materials in view of the compositions.

Further, the inventor has found that defatted soybean powders can be used for eliminating unpleasant smells and imparting much higher protein content to the corn dough cake together with white rice bran materials. The addition of defatted soybean powders also serves to omit the evacuation step during steam kneading, and gives the product more nutrition than conventional rice crackers.

The present invention is thus based on the facts above described, and it relates to a process for obtaining rice-flavoured novel snack food from finely powdered corn materials which comprises mixing finely divided corn materials with finely powdered white rice bran materials or powdered rice grains and kneading them with steam under evacuation. It relates further to a process for eliminating the vapor evacuating step by the addition of defatted soybean or defatted peanut and to the products therefrom.

The white rice bran materials obtained from Japanese rice wine production usually range from 100 to 300 mesh particle size. According to the process of the present invention, particle size of rice bran materials should be in a range miscible with other starch materials. Homogeneous mixing of the raw materials, which is usually include at least two types of powders, is particularly important for the present invention. When homogeneous mixing is not attained, homogeneous water distribution in a dough cake texture can not be expected, thus causing differences in drying speeds in the dough texture and disturbing homogeneous swelling of the dough cake, resulting in deteriorated products with cracks or irregular swelling.

After homogeneous mixing of the raw materials, the mixture is subjected to steam kneading through a kneader for about 10 minutes at a pressure from 0.3 - 0.7 kg and then shaped and baked into the product. The product may be seasoned, such as with soysauce.

An important thing to be noted according to the process of the present invention is the swelling characteristics, that is the essential matter of the process according to the present invention. Swelling characteristics depend on the hardness of the surface films formed on the dough cake during drying. Thus, the hardness can be determined by means of amylography. Swelling level, therefore, depends mainly on the characteristics of the additives in the corn materials.

Accordingly, from the view point of swelling level regulation, special care should be paid to the selection and the characteristics of the additives. It is obvious that incorporation of rice bran materials into corn dough cake influences the swelling characteristics of the product obtained.

From the view point of flavour, it is important to increase the amount of rice bran materials to be added. On the other hand, from the view point of the swelling characteristics and the protein content, up to 30% of rice bran materials may be added to corn materials.

It is also noted that higher drying temperature not only accelerates much film formation on the surface, but also causes amino acid consumption due to the reactions between saccharides, thereby giving a flavour-deteriorated product.

The embodiments of the invention will be clarified in greater detail by the following examples.

EXAMPLE 1

80 kg of a mixture of waxy corn starch containing 100% of amylopectin and white rice bran materials of 300 mesh particle size (mixing ratio 60 : 40) was put into a steam kneader. After mixing it with 50 l of water for 1 minute, the mixture was kneaded with steam for 10 minutes under the a steam pressure of 0.4 kg/cm$^2$ while stirring at 47 r.p.m., thereby producing a dough cake. When 80% of kneading time had passed, the cover of the steam kneader was taken off and steam was discharged therefrom. The dough cake thus produced was further passed through the kneader to make a homogeneous dough cake.

The dough cake was extruded by an extruder into a stick of 2 cm in diameter, and taken out on a plate spread with flour, and then immediately put into a refrigerator at 5° C. After about 4 hours the temperature of the dough cake fell to about 5° C and the cake was left in the refrigerator for 18 hours to be cooled and solidified. The solidified cake was cut into desired pieces of 1.7 mm in thickness and dried for 2 hours at 45° - 50° C in a ventilating drier until the water content was reduced to 30 - 32%. The dried cake was allowed to stand for 20 hours at a room temperature to adjust the water-content uniformly (aging). After aging the cake was baked at 150° C for 3 minutes, at 160° C for 3 minutes and at 180° C for 2 minutes in a baking oven at 94 r.p.m.. The baked cake was seasoned with desired relish and dried to obtain a product.

EXAMPLE 2

80 kg of a mixture of waxy corn starch and white rice bran materials of 300 mesh particle size (mixing ratio 60 : 40) was put into a steam kneader and 48 l of water was added thereto. After mixing for 1 minute the mixture was kneaded with steam for 10 minutes under a steam pressure of 0.4 kg/cm$^2$ while stirring at 47 r.p.m. to produce a dough cake. When 80% of kneading time had passed, unpleasant smells of waxy corn starch and white rice bran materials were removed with steam.

The dough cake thus produced was extruded by an extruder and soaked in cold water to be cooled to about 45° C. The cooled dough cake was further extruded by the extruder to prepare a homogeneous dough cake. The homogeneous dough cake was rolled by a rolling machine to a sheet of 2.5 mm in thickness and shaped into desired pieces. The shaped dough cake was immediately dried at 40° C for 2.7 hours by a ventilating drier, thereby adjusting the water-content of the cake to 20 - 22%. Then it was put into a preheating drier and dried at 50° C for 2 hours and baked at 250° - 300° C for 2 minutes in a baking oven. The baked cake was seasoned with a desired liquid relish and dried to obtain a product.

EXAMPLE 3

65 kg of a mixture of waxy corn starch (56%), rice bran materials (14%) and defatted soybean (30%) was put into a steam kneader and 35 l of water was added thereto. The mixture was kneaded with steam for 5 minutes under a steam pressure of 0.4 kg/cm$^2$ under stirring. During kneading $\beta$-starch included in the mixture was converted into $\alpha$-starch and a homogeneous dough cake was obtained. The dough cake was extruded by an extruder into a stick of a desired diameter and cooled in a refrigerator at 2° C, thereby lowering the temperature of the cake to 5° C. The cooled cake was cut into desired pieces and dried. The product thus prepared with no relish, was fried in an oil bath for 2 minutes at 180° C and seasoned with desired relish to obtain a fried snack food.

EXAMPLE 4

The product with no relish obtained in Example 3 was baked at 200° C for 3 minutes in a baking oven. The baked product was spread with liquid relish and dried to obtain a crunchy snack food having good smells of soybean.

EXAMPLE 5

Examples 1 - 4 were carried out by using waxy grits (deodorized), soaked in water for 4 - 6 hours and drained, as the main raw material, and the same products as obtained in Examples 1 - 4 were obtained.

As mentioned above, according to the present invention, rice-flavoured snack food can be obtained by mixing rice bran materials and/or defatted soybean.

What is claimed is:

1. A process for preparing a snack food which comprises:
   a. homogeneously mixing finely divided corn material selected from the group consisting of waxy corn starch and waxy grits with a sufficent amount of finely divided rice bran having a particle size in the range of 100 to 300 mesh to impart a rice flavor and water, b. kneading the mixture with steam for about 10 minutes at a pressure of 0.3 to 0.7 kg/cm² to produce a dough cake, c. further kneading said dough cake in the absence of steam, d. shaping said dough cake, e. cooling said shaped dough cake, f. drying said cooled dough cake for about 2 to 5 hours at about 40 to 50° C, g. swelling said dried dough cake by baking or frying in oil at 150 to 300° C for 2 to 8 minutes, and h. seasoning said swelled dough cake.

2. The process of claim 1, wherein seasoning is effected by means of soy sauce.

3. The process of claim 1, wherein said rice bran is industrial waste derived from Japanese rice wine production.

4. The process of claim 1, wherein said corn materials constitute the major ingredient of said mixture.

5. The process of claim 1, wherein the mixing step produces a mixture consisting essentially of said corn materials, rice bran, and water.

6. A snack food obtained by the process of claim 1.

7. The snack food of claim 6, wherein the finely divided corn material is defatted waxy corn starch or deodorized waxy grits.

8. The snack food of claim 6, wherein the mixture is heated with steam under evacuation during kneading.

9. The snack food of claim 8, wherein said rice bran is industrial waste derived from Japanese rice wine production.

10. The snack food of claim 8, wherein said corn materials constitute the major ingredient of said mixture.

11. The snack food of claim 8, wherein said mixture consists essentially of said corn materials, rice bran, and water.

12. A process for preparing a snack food, which comprises:

a. homogeneously mixing finely divided corn material selected from the group consisting of waxy corn starch and waxy grits with a sufficient amount of finely divided rice bran having a particle size in the range of 100 to 300 mesh to impart a rice flavor, finely divided defatted soybean or defatted peanut, and water while kneading with steam for about 5 minutes at a pressure of 0.3 to 0.7 kg/cm² to produce a dough cake, b. shaping said dough cake, c. cooling said shaped dough cake, d. drying said cooled dough cake for about 2 to 5 hours at about 40° to 50° C, e. swelling said dried dough cake by baking or frying in oil at 150° to 300° C for 2 to 8 minutes, and f. seasoning said swelled dough cake.

13. The process of claim 12, wherein said rice bran is industrial waste derived from Japanese rice wine production.

14. The process of claim 12, wherein said corn materials constitute the major ingredient of said mixture.

15. The process of claim 12, wherein said mixture consists essentially of said corn materials, rice bran, defatted soybean or peanut, and water.

16. A snack food obtained by the process of claim 12.

17. The snack food of claim 16, wherein said rice bran is industrial waste derived from Japanese rice wine production.

18. The snack food of claim 16, wherein said corn materials constitute the major ingredient of said mixture.

19. The snack food of claim 16, wherein said mixture consists essentially of said corn materials, rice bran, defatted soybean or peanut, and water.

* * * * *